(12) United States Patent  
Nichols

(10) Patent No.: US 7,069,607 B2
(45) Date of Patent: *Jul. 4, 2006

(54) ABSORBENT TOWEL WITH PROJECTIONS

(76) Inventor: Susan Nichols, 2200-23 St., Apt. C, Santa Monica, CA (US) 90405

( * ) Notice: Subject to any disclaimer, the term of this patent is extended or adjusted under 35 U.S.C. 154(b) by 0 days.

This patent is subject to a terminal disclaimer.

(21) Appl. No.: 11/177,900

(22) Filed: Jul. 8, 2005

(65) Prior Publication Data

US 2005/0241067 A1  Nov. 3, 2005

Related U.S. Application Data

(63) Continuation of application No. 10/881,059, filed on Jun. 29, 2004, now Pat. No. 6,961,969.

(60) Provisional application No. 60/484,697, filed on Jul. 3, 2003.

(51) Int. Cl.
*A47G 9/06* (2006.01)
(52) U.S. Cl. ............................................. 5/420; 5/925
(58) Field of Classification Search ................ 5/925, 5/420, 417
See application file for complete search history.

(56) References Cited

U.S. PATENT DOCUMENTS

| 4,147,828 | A | 4/1979 | Heckel et al. |
|---|---|---|---|
| 4,278,719 | A | 7/1981 | Sarnecki |
| 4,738,545 | A | 4/1988 | Westgor |
| 4,899,405 | A | 2/1990 | Rothbard |
| 5,010,610 | A | 4/1991 | Ackley |
| 5,088,136 | A | 2/1992 | Stryker et al. |
| 5,306,545 | A | 4/1994 | Shirayanagi et al. |
| 5,361,435 | A | 11/1994 | Reeves |
| 5,386,603 | A | 2/1995 | Drust |
| 5,467,487 | A | 11/1995 | Sicard |
| 5,735,004 | A | 4/1998 | Wooten et al. |
| 5,740,567 | A | 4/1998 | Mitchell |
| 5,948,707 | A | 9/1999 | Crawley et al. |
| 6,022,617 | A | 2/2000 | Calkins |
| 6,294,240 | B1 | 9/2001 | Brunetto |
| 6,419,988 | B1 | 7/2002 | Novell |
| 6,493,891 | B1 | 12/2002 | Livingston |

(Continued)

FOREIGN PATENT DOCUMENTS

TW  090213932  12/2002

(Continued)

OTHER PUBLICATIONS

Website: http://www.aquis.com owned by Brittane Corporation, San Francisco, CA USA.

*Primary Examiner*—Frederick L. Lagman
(74) *Attorney, Agent, or Firm*—James P. Broder

(57) ABSTRACT

A towel (10) includes a base layer (12) and a plurality of raised projections (14) that project away from the base layer (12). The base layer (12) has a first side (16) and a second side (18). In one embodiment, the projections (14) are discontinuously positioned and are each separately secured to one or both of the sides (16, 18) of the base layer (12). In one embodiment, the projections (14) have a higher coefficient of static friction than the base layer (12) relative to a surface (20). The base layer (12) can be formed from an absorbent material and the projections (14) can be formed from a relatively non-absorbent material. In one embodiment, the projections (14) cover less than approximately 50 percent of one of the sides (16, 18) of the base layer (12). Moreover, in one embodiment, the projections (14) can be substantially hemispherical in shape.

26 Claims, 3 Drawing Sheets

U.S. PATENT DOCUMENTS 6,579,816 B1 6/2003 Lockett
6,663,537 B1 12/2003 McCoy
6,702,726 B1 3/2004 Lin

FOREIGN PATENT DOCUMENTS

WO  WO 94/14361 A1  7/1994

ABSORBENT TOWEL WITH PROJECTIONS

REFERENCE TO RELATED APPLICATIONS

The present application is a continuation application of U.S. patent application Ser. No. 10/881,059, filed on Jun. 29, 2004, now U.S. Pat. No. 6,961,969 which claims the benefit on U.S. Provisional Application Ser. No. 60/484,697, filed on Jul. 3, 2003. The present application claims priority on U.S. patent application Ser. No. 10/881,059 under 35 U.S.C. § 120. To the extent permitted, the contents of U.S. patent application Ser. No. 10/881,059 and U.S. Provisional Application Ser. No. 60/484,697 are incorporated herein by reference.

BACKGROUND

Strength and coordination exercises are becoming increasingly more popular these days. Within health-conscious cultures, sports such as jogging, swimming and bicycling have long been common forms of exercise. More recently, however, those desiring to stay in shape are seeking different, more innovative ways to achieve or maintain a desired level of physical conditioning and mental health, while at the same time trying to decrease the incidence of injuries due to high impact exercising.

For example, various forms of yoga have gained greater acceptance within today's society. Yoga is known to Increase strength and flexibility, while relaxing the mind through focusing on holding certain body positions. Consequently, yoga and other similar disciplines can provide participants with an increased fitness level and improved state of mind. Typically, cushioned rubber mats are used by those who practice yoga for providing a soft surface for kneeling, standing, and lying down. However, due to the physical demand of balancing while holding various poses for extended periods of time, the participants can perspire onto the mats, causing the mats to become slick, thereby increasing the likelihood of a slipping injury. Thus, the participant can become distracted from proper focus during the practice of yoga. Further, the mats are generally relatively non-absorbent, and offer few benefits other than creating a padded area for use by the yoga participants.

SUMMARY

The present invention is directed to a towel that includes a base layer and a plurality of raised projections that project away from the base layer. The base layer has a first side and a second side. In one embodiment, the projections can be discontinuously positioned and can each be separately secured to one or both of the sides of the base layer. In one embodiment, the projections have a higher coefficient of static friction than the base layer to inhibit relative movement between the towel and a surface upon which the towel is placed when the projections are in contact with the surface.

In one embodiment, the base layer is formed from a liquid-absorbing material such as a microfiber fabric material. Further, at least some of the projections are formed at least partially from a relatively non-absorbent latex material. In one embodiment, the projections cover less than approximately 50 percent of one of the sides of the base layer. Moreover, in one particular embodiment, at least some of the projections are substantially hemispherical in shape.

The present invention also includes a method for manufacturing a towel.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
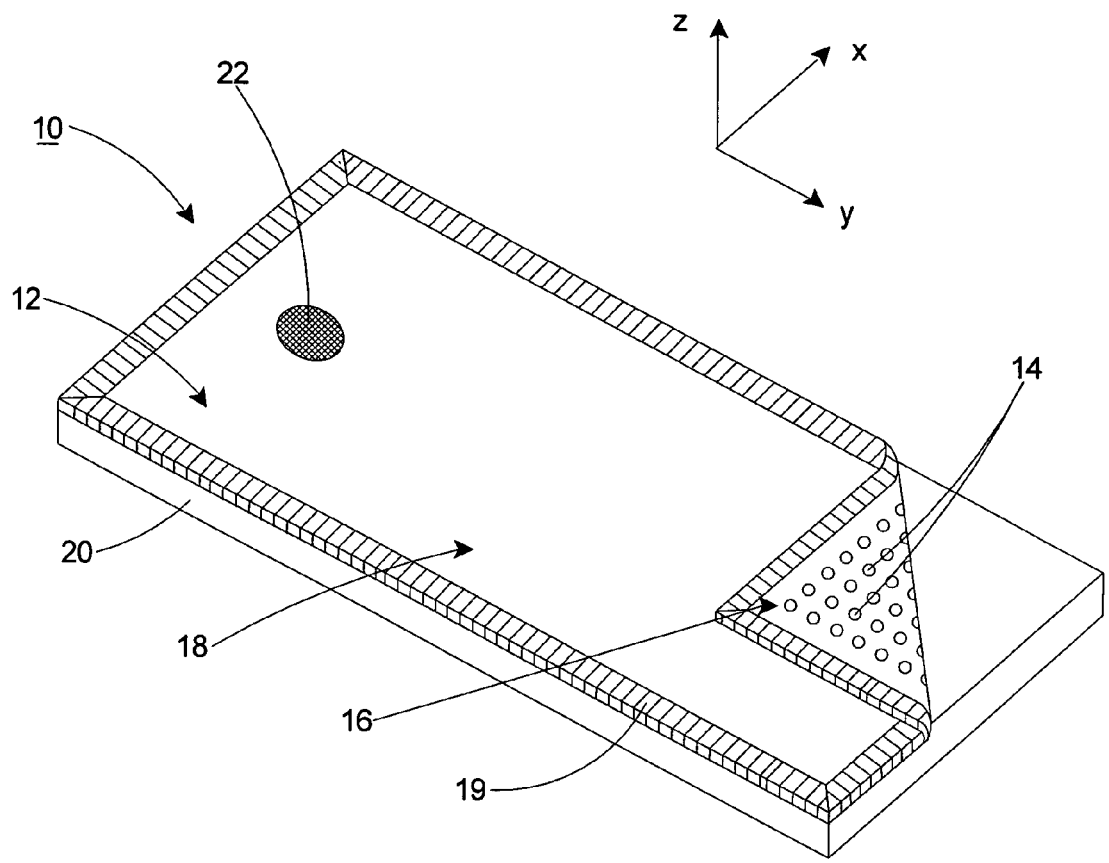
FIG. 1 is a perspective view of one embodiment of a towel having features of the present invention, shown in a first configuration.

FIG. 1 is a perspective view of a towel 10 in a first, unrolled configuration. In this embodiment, the towel 10 includes a base layer 12 and a plurality of raised projections 14 that project away from the base layer 12 as described herein. The base layer 12 illustrated in FIG. 1 has a first side 16 and a second side 18. In this embodiment, the projections 14 are secured to the first side 16. It is recognized, however, that either side 16, 18 can be the first side 16 or the second side 18. For example, the projections 14 can be secured to the second side 18 of the base layer 12. The towel 10 also includes a perimeter edge 19 that can be bound by any generally acceptable manner known to those skilled in the art.

FIG. 1 includes an orientation system that illustrates an X-axis, a Y-axis that is orthogonal to the X-axis and a Z-axis that is orthogonal to the X- and Y-axes. It should be noted that these axes can also be referred to as the first, second and third axes, respectively, and that any of the axes can be the first, second or third axis.

In the embodiment illustrated in FIG. 1, towel 10 can be placed on top of a surface 20 that may otherwise become slick or slippery when moisture is introduced onto the surface 20. As shown in FIG. 1, the surface 20 can be any suitable type of yoga or other sports mat, such as those including closed or open-cell foam, for use during yoga or other sporting exercises, as explained in greater detail below. Alternatively, the surface 20 can be any type of flooring material, a table or other furniture, the ground, or any other type of supporting surface.

The dimensions of the towel 10 can vary. The towel 10 can be sized to be substantially similar to the surface 20 upon which the towel 10 is placed. In one embodiment, the towel 10 can have dimensions of approximately 24 inches by 68 inches, which are the approximate dimensions of a standard sized yoga mat 20. However, the towel 10 can have dimensions larger or smaller than 24 inches by 68 inches. For example, in alternative embodiments, the towel 10 can be sized for use as a washcloth, a hand towel, a beach towel, a bath towel, a bath mat, a dish towel, a gym or sport towel, a drop cloth, a throw rug, or a baby changing mat, as non-exclusive examples.

Further, although the towel 10 is particularly suited for use as a non-clothing item, the towel 10 can be used in other applications where absorbency is beneficial. For instance, the towel 10 can be incorporated into and/or manufactured for use as clothing, such as a bathrobe, a shirt, pants, a hat, a scarf, socks, or any other suitable clothing or non-clothing item. With this design, any moisture such as perspiration, precipitation or incidental moisture can be absorbed by the towel 10 as necessary.

The base layer 12 can be formed from relatively absorbent materials that can vary depending upon the design requirements of the towel 10. For instance, the base layer 12 can include any suitably absorbent natural fibers or fabrics, such as cotton, silk, wool, hemp, etc., and/or synthetic materials such as acrylics, polyester microfiber, nylon and/or rayon, as non-exclusive examples.

Further, the base layer 12 can have a wide range of thicknesses, weights and/or densities depending upon the absorbency and/or specific usage requirements of the towel 10. The base layer 12 can also include different colored materials and/or different colored patterns, images and the like.

For example, in the embodiment illustrated in FIG. 1, the second side 18 of the base layer 12 includes a focal region 22 having a color that is different than substantially the remainder of the base layer 12. With this design, an individual performing yoga, martial arts or other sporting activities can focus his or her attention on the focal region 22 to assist with concentration and/or focus during participation in such exercises. The focal region 22 can be formed from the same material used to form the remainder of the base layer 12, or the focal region 22 can be formed from a different material. In the embodiment illustrated in FIG. 1, the focal region 22 is somewhat disc-shaped and is sized small enough to allow the user to focus on the focal region 22 without substantial movement of the user's eyes during exercise. For example, the focal region 22 can be between approximately 1.0 centimeter and 6.0 centimeters in diameter. However, the size of the focal region 22 can be outside this range. In alternative embodiments, the focal region 22 can have any other suitable configuration, i.e. rectangular, triangular, linear, oval or another appropriate geometry.

The material(s) used for the projections 14 can be varied. For example, the projections 14 can be formed from a substantially non-absorbent material such as various forms of plastic (e.g., latex), rubber, epoxy, or any other suitable material, as non-exclusive examples. The material used to form the projections 14 can have a relatively high coefficient of static friction. In one embodiment, the material used to form the projections 14 can have a coefficient of static friction that is greater than a coefficient of static friction of the base layer 12. With this design, the relatively high static friction of the projections 14 decrease the likelihood that the towel 10 will slip, slide or otherwise move relative to the surface 20 upon which the towel 10 is positioned. Stated another way, the projections 14 provide greater traction between the towel 10 and the surface 20.

The positioning, shape and size of the projections 14 can vary. In one embodiment, the projections 14 are positioned in a pattern. For example, in the embodiment illustrated in FIG. 1, the projections 14 are positioned in a grid-like arrangement on the base layer 12. In this embodiment, the projections 14 are positioned in a plurality of substantially similar rows, each with a relatively consistent spacing between rows and between individual projections 14. Alternatively, the projections 14 can be positioned in a substantially random manner on the base layer 12.

Further, in the embodiment illustrated in FIG. 1, each projection 14 is separately secured to the first side 16 of the base layer 12 in an intermittent, unconnected and/or discontinuous manner. In one embodiment, the projections 14 can be secured to the base layer 12 by using a heat treatment method, which can include melting the projections 14 into position on the base layer 12. Examples of alternative methods that can be used to secure the projections 14 to the base layer 12 include chemical bonding, adhesive, or any other suitable means, although these methods are not intended to be limiting in any manner.

Because of the spacing between adjacent projections 14, the base layer 12 can more readily absorb moisture from the surface 20 and/or the user, with reduced or no interference by the projections 14. Stated another way, any inhibition of moisture absorption caused by the projections 14 is reduced or eliminated because a substantially portion of the first side of the base layer 12 is still exposed, notwithstanding the quantity of projections 14 secured to the base layer 12. For example, in one embodiment, the projections 14 are sized, shaped and positioned to cover less than approximately 20% of the total area of the base layer 12. In alternative embodiments, the projections 14 are sized, shaped and positioned to cover less than approximately 25%, 30%, 40%, 50%, 75% or 90% of the total area of the base layer 12.

In still an alternative embodiment, two or more of the projections 14 can be continuous, e.g. secured together on the base layer 12 to form lines, curves or other patterns on the base layer 12. Moreover, in one embodiment, each of the projections 14 can be symmetrical relative to two or more axes. For example, in the embodiment illustrated in FIG. 1, the projections 14 are symmetrical relative to three axes: the X-axis, the Y-axis and the Z-axis. In another embodiment, the projections 14 are symmetrical relative to two different axes, such as the X-axis and the Y-axis, although the particular axes about which the projections 14 are symmetrical can vary. With these designs, the manufacturing process is facilitated and the tactile stimulus of the user is enhanced, as set forth in greater detail below.

The spacing between the projections 14 can vary. In one embodiment, the spacing of the projections 14 can be approximately one-quarter inch on center. However, the spacing between the projections 14 can be greater or less than one-quarter inch on center to achieve the desired level of inhibition of movement between the projections 14 (and thus the base layer 12) and the surface 20. Additionally, because the projections 14 can be positioned relatively close to one another while not unduly inhibiting moisture absorption by the base layer 12, there is less chance for the base layer 12 to move, e.g., between the projections 14, relative to the surface 20. Consequently, injuries caused by slippage of the towel 10 relative to the surface 20 are reduced.

Further, the distance that each of the projections 14 projects or extends away from the base layer 12 can vary. For instance, in one embodiment, the projections 14 can project at least approximately 0.1 millimeters away from the first side 16 of the base layer 12. In alternative embodiments, the projections 14 can project at least approximately 0.2 millimeters, 0.3 millimeters, 0.5 millimeters, 0.75 millimeters, 1.0 millimeters, 1.5 millimeters, 2.0 millimeters, 3.0 millimeters or 5.0 millimeters away from the first side 16 of the base layer 12.

In alternative embodiments, the projections 14 can project within the range of (i) greater than 0.1 millimeters and less than 5.0 millimeters, (ii) greater than 0.2 millimeters and less than 2.0 millimeters, or (iii) greater than 0.5 millimeters and less than 1.0 millimeter away from the first side 16 of the base layer 12. Still alternatively, the projections 14 can project less than or greater than the foregoing distances and ranges away from the first side 16 of the base layer 12. Moreover, depending upon the spacing of the projections 14, the height of the projections 14, and/or the thickness and/or weight of the base layer 12, a user can receive various tactile sensations when in static or dynamic contact with the towel 10, including force on certain pressure points of the user's body or a massage of the musculature of the user, as non-exclusive examples. With the foregoing designs, the user can receive the requisite level of tactile stimulus during usage of the towel 10.

Figure 2:
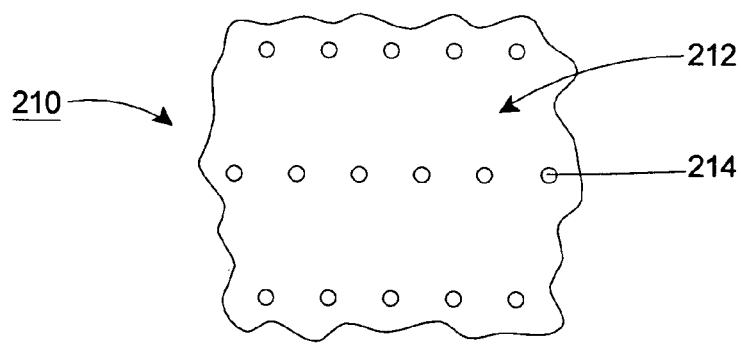
FIG. 2 is a partial plan view of a portion of another embodiment of the towel having features of the present invention.

FIG. 2 is a partial plan view of an alternative embodiment of the towel 210. In this embodiment, the projections 214 are positioned in a repeated, somewhat diamond-shaped pattern on the base layer 212 so that the rows are somewhat staggered from those illustrated in FIG. 1. Still alternatively, the projections 214 can be separately positioned to form concentric circles, triangles, or any other suitable geometric patterns.

FIGS. 3A–6B show various representative shapes of several embodiments of the projections 14. The embodiments depicted in FIGS. 3A–6B are provided for convenience of discussion only, and are not intended to limit the scope of the present invention in any manner. The shape of the projections 14 can vary depending upon the level of tactile stimulus desired by the user in contact with the towel 10, and/or the extent to which a higher level of friction is necessary or desired between the projections 14 and the surface 20.

Figure 3A:
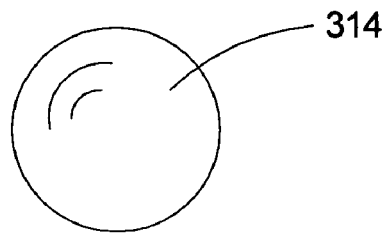
FIG. 3A is a perspective view of a first embodiment of a projection.
Figure 3B:
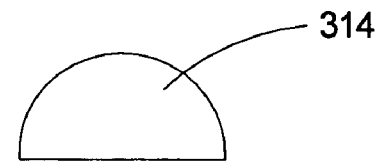
FIG. 3B is a side view of the projection illustrated in FIG. 3A.

FIG. 3A is a top view of one embodiment of the shape of a projection 314. In this embodiment, the projection 314 has a round or circular footprint. FIG. 3B is a side view of the projection 314 illustrated in FIG. 3A. FIG. 3B shows that the projection 314 can have a substantially dome or hemispherical shape.

Figure 4A:
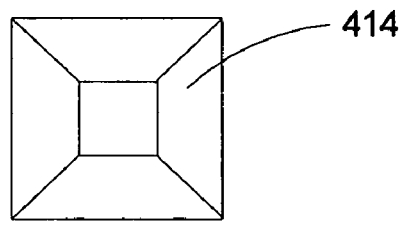
FIG. 4A is a perspective view of a second embodiment of a projection.
Figure 4B:
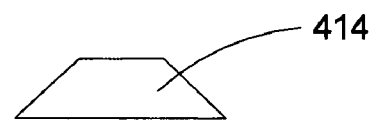
FIG. 4B is a side view of the projection illustrated in FIG. 4A.

FIG. 4A is a top view of one embodiment of the shape of a projection 414. In this embodiment, the projection 414 has a rectangular footprint. FIG. 4B is a side view of the projection 414 illustrated in FIG. 4A. FIG. 4B shows that the projections 414 have a substantially frusto-pyramidal shape.

Figure 5A:
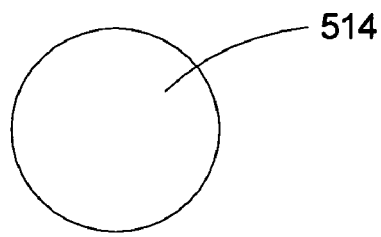
FIG. 5A is a perspective view of a third embodiment of a projection.
Figure 5B:
FIG. 5B is a side view of the projection illustrated in FIG. 5A.

FIG. 5A is a top view of one embodiment of the shape of a projection 514. In this embodiment, the projection 514 has a round or circular footprint. FIG. 4B is a side view of the projection 514 illustrated in FIG. 5A. FIG. 5B shows that the projection 514 can have a substantially cylindrical, planar or flat shape.

Figure 6A:
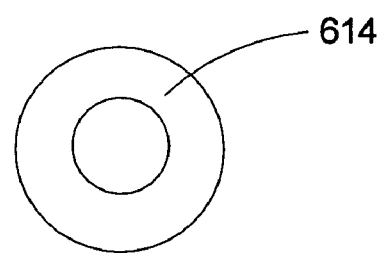
FIG. 6A is a perspective view of a fourth embodiment of a projection.
Figure 6B:
FIG. 6B is a side view of the projection illustrated in FIG. 6A.

FIG. 6A is a top view of one embodiment of the shape of a projection 614. In this embodiment, the projection 614 has a round or circular footprint. FIG. 6B is a side view of the projection 614 illustrated in FIG. 6A. FIG. 6B shows that the projection 614 can have a substantially frusto-conical shape.

Figure 7:
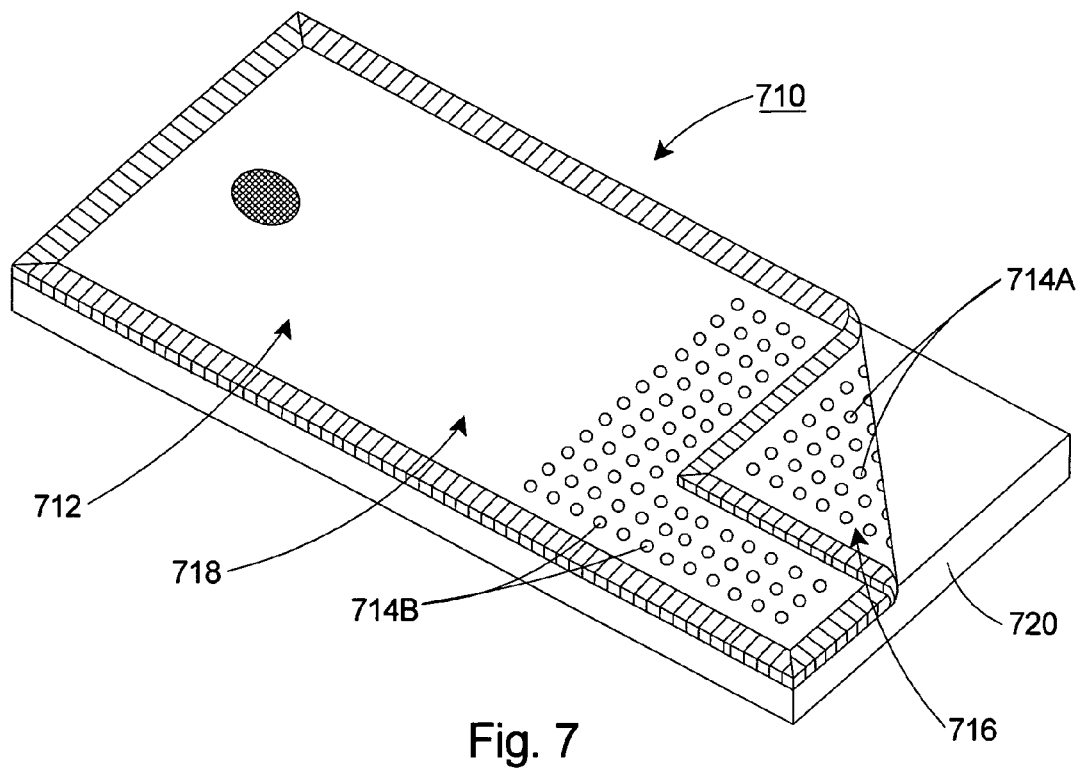
FIG. 7 is a perspective view of another embodiment of a towel having features of the present invention.

FIG. 7 is an alternative embodiment of a towel 710. In this embodiment, the towel 710 includes a plurality of first projections 714A on each of the first side 716 of the base layer 712, and a plurality of second projections 714B the second side 718 of the base layer 712. With this design, the towel 710 can be used with either side 716, 718 facing downward (toward a surface 720) or upward (away from the surface 720). Further, the user can feel an increase in the tactile stimulation depending upon the quantity, shape, size and positioning of the projections 714A, 714B secured to the base layer 712 of the towel 710. The projections 714A, 714B can be substantially the same shape, size and positioning on both sides 716, 718, or the shape, size and positioning can differ from the first side 716 to the second side 718.

Figure 8:
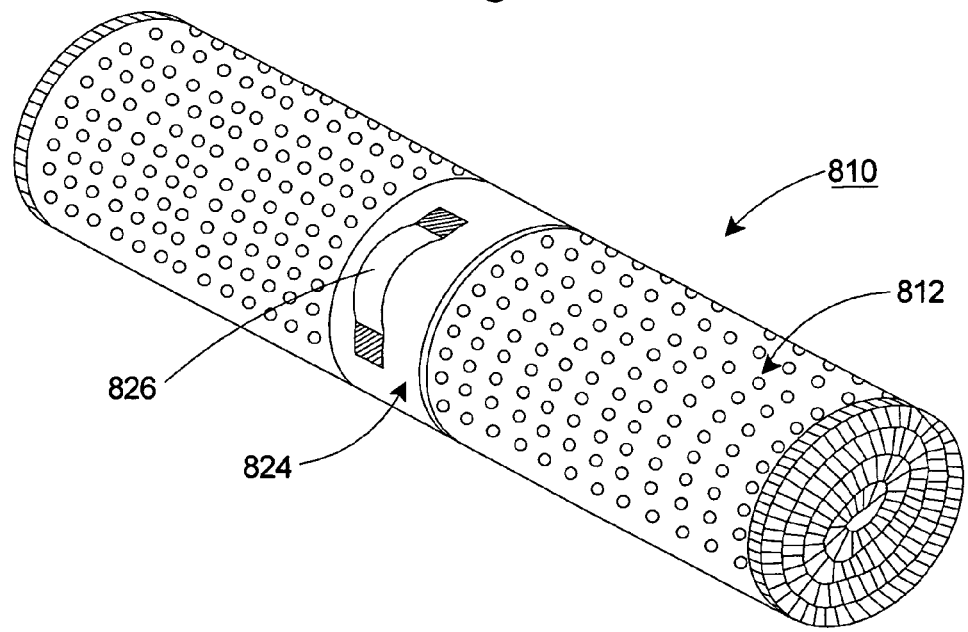
FIG. 8 is a perspective view of another embodiment of a towel having features of the present invention, shown in a second configuration.

FIG. 8 illustrates an embodiment of the towel 810 in a second, rolled-up configuration. In this embodiment, the towel 810 can be substantially similar to those previously described. However, the towel 810 can also include a strap 824 that is removably or fixedly attached to the base layer 812. The strap 824 can be attached to the base layer 812 by any suitable means, including loop and pile, hook and loop, snaps, etc. Alternatively, the strap 824 can be tied around the base layer 812 to maintain the towel 810 in the rolled-up configuration. The strap 824 can include a handle 826 for more easily carrying or otherwise transporting the towel 810 between locations. Further, the strap 824 can be used for maintaining the towel 810 in the second, rolled up configuration (as illustrated in FIG. 8), e.g. for storage, until the towel 810 is ready for use.

While the particular towel 10 as herein shown and disclosed in detail is fully capable of obtaining the objects and providing the advantages herein before stated, it is to be understood that it is merely illustrative of some of the presently preferred embodiments of the invention and that no limitations are intended to the details of construction or design herein shown other than as described in the appended claims.

What is claimed is:

1. A towel comprising:
   a base layer having (i) a first side that is at least partially formed from a liquid-absorbing material, and (ii) a second side that is substantially opposite the first side and at least partially formed from a liquid absorbing material, the second side being at least partially exposed; and
   a plurality of discontinuously positioned projections that are secured to and project away from the first side, the projections being formed from a substantially non-absorbent material.

2. The towel of claim 1 wherein the entire second side is formed from a liquid absorbing material.

3. The towel of claim 1 wherein the entire second side is exposed.

4. The towel of claim 1 wherein the projections are formed from a material selected from the group consisting of plastic, rubber and epoxy.

5. The towel of claim 1 wherein at least one of the projections projects at least approximately 0.1 millimeters away from the first side of the base layer.

6. The towel of claim 1 wherein the projections cover less than approximately 90% of the first side of the base layer.

7. The towel of claim 1 wherein the projections cover less than approximately 50% of the total area of the base layer.

8. The towel of claim 1 wherein at least two of the projections are positioned at least approximately one-quarter inch on center from one another.

9. The towel of claim 1 wherein at least two of the projections are positioned less than approximately one-quarter inch on center from one another.

10. The towel of claim 1 wherein the base layer is formed from a material that includes a microfiber material.

11. The towel in claim 1 wherein at least two of the projections are substantially similar in shape to one another.

12. A towel comprising:
    a base layer having (i) a first side that is at least partially formed from a liquid-absorbing material, and (ii) a second side that is substantially opposite the first side and at least partially formed from a liquid-absorbing material, the second side being at least partially exposed; and
    a plurality of discontinuously positioned projections that are secured to and project away from the first side, the projections being formed from a material selected from the group consisting of plastic, rubber and epoxy.

13. The towel of claim 12 wherein the entire second side is formed from a liquid absorbing material.

14. The towel of claim 12 wherein the entire second side is exposed.

15. The towel of claim 12 wherein at least one of the projections projects at least approximately 0.1 millimeters away from the first side of the base layer.

16. The towel of claim 12 wherein the projections cover less than approximately 90% of the first side of the base layer.

17. The towel of claim 12 wherein the projections cover less than approximately 50% of the total area of the base layer.

18. The towel of claim 12 wherein at least two of the projections are positioned at least approximately one-quarter inch on center from one another.

19. The towel of claim 12 wherein at least two of the projections are positioned less than approximately one-quarter inch on center from one another.

20. The towel of claim 12 wherein the base layer is formed from a material that includes a microfiber material.

21. The towel in claim 12 wherein at least two of the projections are substantially similar in shape to one another.

22. A method for manufacturing a towel, the method comprising the steps of:
    forming both a first side and a second side of a base layer at least partially from a liquid-absorbing material, the second side being at least partially exposed;
    securing a plurality of projections formed from a substantially non-absorbent material to the first side in a discontinuous manner so that the projections project away from the first side.

23. The method of claim 22 wherein the step of forming includes forming the entire second side from a liquid absorbing material.

24. The method of claim 22 wherein the step of forming includes forming the base layer so that the entire second side is exposed.

25. The method of claim 22 wherein the step of forming the plurality of projections includes forming at least one of the projections from a material selected from the group consisting of plastic, rubber and epoxy.

26. The method of claim 22 wherein the step of securing includes using a heat treatment for securing the plurality of the projections to the first side.

\* \* \* \* \*